United States Patent [19]
Wedding

[11] Patent Number: 5,510,919
[45] Date of Patent: Apr. 23, 1996

[54] OPTICAL SYSTEM FOR TRANSMITTING A MULTILEVEL SIGNAL

[75] Inventor: Berthold Wedding, Korntal-Münchingen, Germany

[73] Assignee: Alcatel NV, Rijswijk, Netherlands

[21] Appl. No.: 345,618

[22] Filed: Nov. 28, 1994

[30] Foreign Application Priority Data

Dec. 4, 1993 [DE] Germany .......................... 43 41 408.7

[51] Int. Cl.$^6$ .......................... H04J 14/00; H04B 10/04; H04B 10/06
[52] U.S. Cl. .......................... 359/115; 359/173; 359/181; 359/189; 375/287; 375/289
[58] Field of Search .......................... 359/181, 182, 359/188, 185, 115, 189, 173; 375/287, 289; 327/74–76

[56] References Cited

U.S. PATENT DOCUMENTS

| | | | |
|---|---|---|---|
| 3,571,725 | 3/1971 | Kaneko | 375/287 |
| 4,410,878 | 10/1983 | Stach | 359/181 |
| 4,524,462 | 6/1985 | Cottatelucci | 375/289 |
| 4,763,326 | 8/1988 | Krick | 359/187 |
| 5,008,957 | 4/1991 | Kiyano | 359/181 |
| 5,371,625 | 12/1994 | Wedding et al. | 359/173 |

FOREIGN PATENT DOCUMENTS

| | | | |
|---|---|---|---|
| 0554736 | 8/1993 | European Pat. Off. | |
| 3525105 | 1/1987 | Germany | |
| 3523467 | 1/1987 | Germany | 359/181 |
| 4035996 | 5/1992 | Germany | |
| 0112103 | 9/1979 | Japan | 359/18 |
| 3291036 | 12/1991 | Japan | 359/181 |
| 5110514 | 4/1993 | Japan | 359/189 |

OTHER PUBLICATIONS

"10 Gbit/s to 260000 Subscribers Using Optical Amplifier Distribution Network", B. Wedding et al, *ICC/Supercomm 92*, Optical Communications 300 Level Session, Impact of Optical Amplifiers on Network Architectures, pp. 1–8.
U. Tietze et al, *Halbleiter–Schaltungstechnik*, 8th ed., Springer–Verlag 1986, Chapter 8.5.1, p. 178.

*Primary Examiner*—Leslie Pascal
*Attorney, Agent, or Firm*—Ware, Fressola, Van Der Sluys & Adolphson

[57] ABSTRACT

In optical transmission systems it is desirable to increase the bit rate of digital signals to, e.g., 40 Gb/s and more. In such systems there is an upper bit-rate limit above which conventional directly modulated lasers and their drive electronics cannot be employed. An optical transmission system is disclosed in whose optical transmitter (1) an electric multilevel signal (V) composed of two electric digital signals ($V_1$, $V_2$) modulates a semiconductor laser (4), so that an optical multilevel signal (V) is transmitted. The optical receiver (2) contains a decision circuit (7) which recovers the digital signals ($V_1$, $V_2$).

14 Claims, 3 Drawing Sheets

000
OPTICAL SYSTEM FOR TRANSMITTING A MULTILEVEL SIGNAL

TECHNICAL FIELD

The present invention relates to an optical transmission system and also, more particularly, to an optical transmitter with an electrical-to-optical transducer and to a decision circuit for use in a receiver of the novel transmission system.

BACKGROUND OF THE INVENTION

Optical transmission systems with an optical transmitter, an optical waveguide and optical receiver, the optical transmitter comprising an electrical-to-optical transducer, and the optical receiver comprising an optical-to-electrical transducer and a decision circuit are known, e.g., from EP-A2-554 736 corresponding to U.S. Pat. No. 5,371,625. There, an electrical-to-optical transducer at the transmitting end emits an optical signal, e.g., frequency-modulated by an electric digital signal. The optical signal is transmitted over an optical waveguide to an optical receiver having an optical-to-electrical transducer and a decision circuit. With the decision circuit the digital signal is recovered.

It is desirable to increase the transmission speed of digital signals, i.e., the bit rate, to, e.g., 40 Gb/s.

From the literature, systems are known in which signals are transmissible at a bit rate of 10 Gb/s. From B. Wedding et al, "10 Gb/s to 260 000 Subscribers Using Optical Amplifier Distribution Network", Contribution for ICC/Supercom '92, Optical Communications 300 Level Session "Impact of Optical Amplifiers on Network Architectures", it is known, for example, to modulate a laser (high-speed multiquantum-well DFB laser) for this bit rate directly. "Direct modulation" means that the injection current of the laser is varied in accordance with the signal to be transmitted. In this manner, intensity or frequency modulation is possible. For this application, 10-Gb/s transmission, the DFB laser must be optimized to reduce undesired modulation characteristics. These undesired characteristics include the chirp effect (frequency instability which occurs during modulation) and parasitic impedances of the laser.

For these reasons, there is an upper limit of the bit rate above which conventional directly modulated lasers can no longer be used. An upper limit also exists for the drive electronics of the laser.

DISCLOSURE OF INVENTION

It is an object of the invention to provide an optical transmission system in which signals can be transmitted at a high bit rate.

According to the present invention, an optical transmission system with an optical transmitter, an optical waveguide, and an optical receiver, wherein the optical transmitter comprises an electrical-to-optical transducer and the optical receiver comprises an optical-to-electrical transducer and a decision circuit also includes in the optical transmitter an electrical power combiner which adds a first applied electric digital signal and a second applied electric digital signal of equal bit period and different amplitudes bit by bit to form an electric multilevel signal which is converted to an optical signal by the electrical-to-optical transducer and then transmitted over the optical waveguide to the optical receiver, in which the decision circuit recovers the digital signals from the electric multilevel signal provided by the optical-to-electrical transducer.

Further advantageous aspects of the invention are defined in the subclaims.

According to a second aspect of the present invention, an optical transmitter with an electrical-to-optical transducer includes a power combiner which adds a first applied electric digital signal and a second applied electric digital signal of equal bit period and different amplitudes bit by bit to form an electric multilevel signal which is converted to an optical signal by the electrical-to-optical transducer and then transmitted.

One advantage of the invention is that in this optical transmission system the bit rate can be increased with unchanged lasers and unchanged drive electronics.

These and other objects, features and advantages of the present invention will become more apparent in light of the detailed description of a best mode embodiment thereof, as illustrated in the accompanying drawing.

BRIEF DESCRIPTION OF THE DRAWING

FIG. 2, including

BEST MODE FOR CARRYING OUT THE INVENTION

Figure 1:
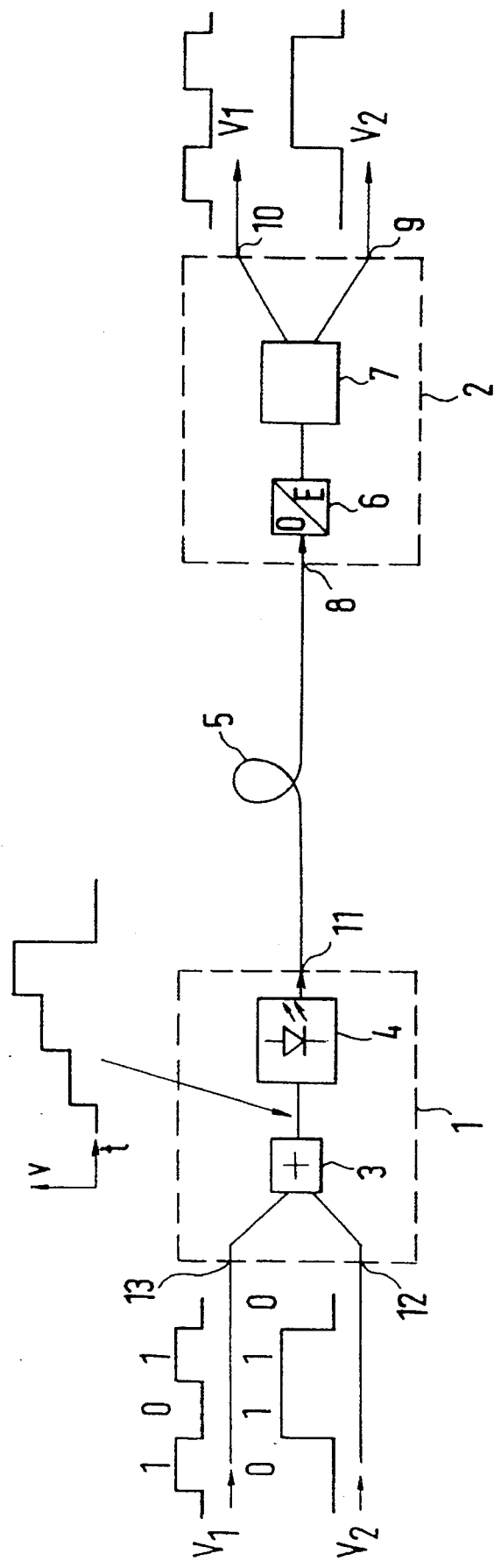
FIG. 1 shows a novel optical transmission system, according to the present invention, with an optical transmitter.

An optical transmission system, according to the present invention, is illustrated in FIG. 1. It has an optical transmitter 1, a transmission link with an optical waveguide 5, and an optical receiver 2.

The optical transmitter has a power combiner 3, an electrical-to-optical transducer 4, which is preferably a semiconductor laser, two inputs 12, 13, and one output 11. A first electric digital signal $V_1$ and a second electric digital signal $V_2$ are provided to the power combiner 3 at the inputs 13 and 12, respectively. The power combiner 3 has an output signal (V) that is connected to an input of the semiconductor laser 4. The optical signal provided by the latter is coupled into the optical waveguide 5 at an output 11.

The power combiner 3 adds the digital signals $V_1$, $V_2$ bit by bit to form an electric multilevel signal V. This process will be explained below with reference to FIG. 2.

The semiconductor laser is modulated directly by the electric multilevel signal V. It is also possible to provide, instead of the directly modulated laser, a device in which the continuous light emitted by a semiconductor laser is modulated externally by an optical modulator. In that case, the electric multilevel signal V is applied to the optical modulator.

The multilevel signal V modulates the output light of the electrical-to-optical transducer 4 in frequency or amplitude. This multilevel signal V is particularly advantageous in a transmission system in which signals are transmitted in frequency-modulated form. Such a system is disclosed in the above-mentioned EP-A2-544 736.

The optical receiver 2 has an optical-to-electrical transducer 6, which is a PIN photodiode, for example, a decision circuit 7, an optical input 8, and two electrical outputs 9, 10.

An electrical output of the photodiode 6 is connected via one or more amplifiers (not shown) to the decision circuit 7, which is connected to the two outputs 9, 10. The optical signal transmitted to the optical receiver is received at the input 8 by the photodiode 6 and converted to an electric multilevel signal which is applied to the decision circuit 7 for evaluation. The electric digital signals $V_1$, $V_2$ are shown at the inputs 12, 13 of the optical transmitter 7 and at the outputs 9, 10 of the optical receiver 2. The electric multilevel signal V is shown at the connection between power combiner 3 and semiconductor laser 4. For all signals the amplitude is plotted as a function of time.

Figure 2A:
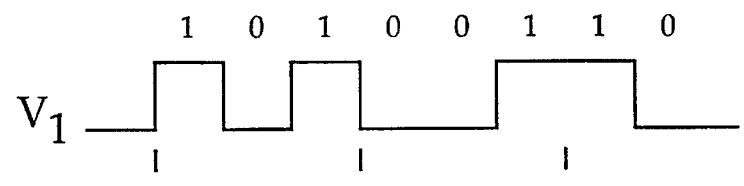
FIG. 2(a), 2(b) and 2(c), shows an example of the formation of a multilevel signal, according to the present invention.
Figure 2B:
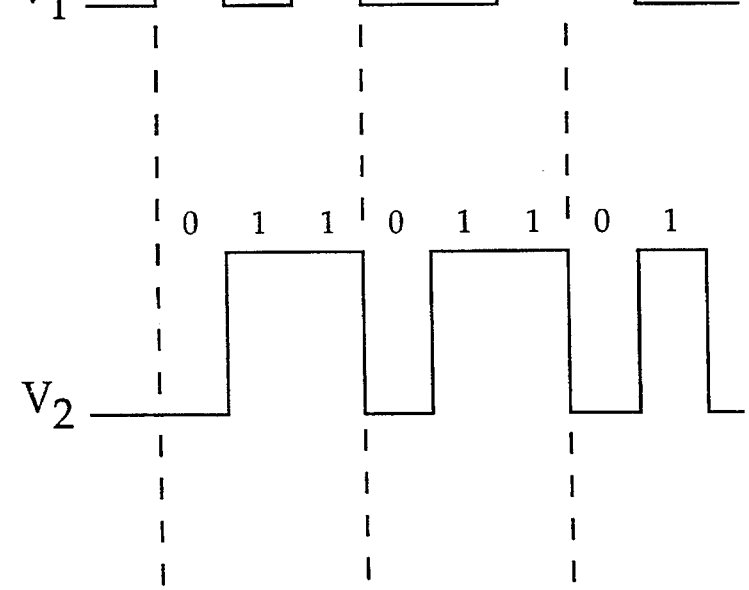
Figure 2C:
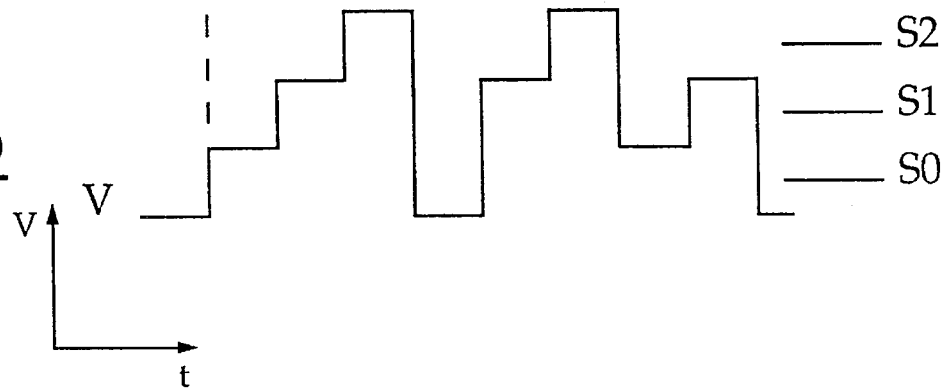

FIGS. 2(a)–(c) share a common time line and together show an example of the formation of a multilevel signal V, shown in FIG. 2(a) as a four-level signal composed of two electric digital signals $V_1$, $V_2$ shown in FIGS. 2(a) and 2(b), respectively. The two signals have the same bit period which is bit-by-bit time-aligned. The digital signal $V_1$ has the states "1, 0, 1, 0, 0, 1, 1, 0" and the digital signal $V_2$ has the states "0, 1, 1, 0, 1, 1, 0, 1". The amplitude of the digital signal $V_2$ in the illustrated example is twice as large as that of the digital signal $V_1$. The amplitude in all three FIGS. 2(a)–(c) is plotted as a function of time.

The four-level signal V is obtained by adding the two digital signals $V_1$, $V_2$ bit by bit, i.e., $V=V_1+V_2$.

To make the amplitude of the digital signal $V_2$ twice as large as that of the digital signal $V_1$, the digital signal $V_1$ may be attenuated with respect to $V_2$ by a factor of 2, for example. This can be accomplished by an attenuator within or outside the optical transmitter 1. For the principle of operation, however, this is irrelevant. What is important is that the amplitudes are different and this difference can be selectively made using the principles disclosed herein.

The bit period in the resulting four-level signal V is equal to that of the digital signals $V_1$, $V_2$. This four-level signal thus contains double information, namely that of the two digital signals $V_1$, $V_2$, in one bit period. This makes it possible to increase the amount of information that can be transmitted by a factor of 2, which corresponds to a doubling of the bit rate.

In the following figures, use is made of decision units consisting of a comparator in series with a D flip-flop. Comparators and their operation are known, e.g., from U. Tietze, C. Schenk: "Halbleiter-Schaltungstechnik", 8th edition, Springer-Verlag 1986, Chapter 8.5.1, page 178. when the input voltage difference passes through zero, the output voltage assumes a logic 1 state.

In the following figures, the four-level signal is applied to the (+) input of the comparator, and the corresponding threshold value to the (−) input. The output voltage thus assumes a logic 1 state when the four-level signal V is greater than the respective threshold value. The D flip-flop serves to store the respective logic state. Signals are processed synchronously with central clock pulses. For simplicity, no clock-pulse line is shown in the figures.

Figure 3:
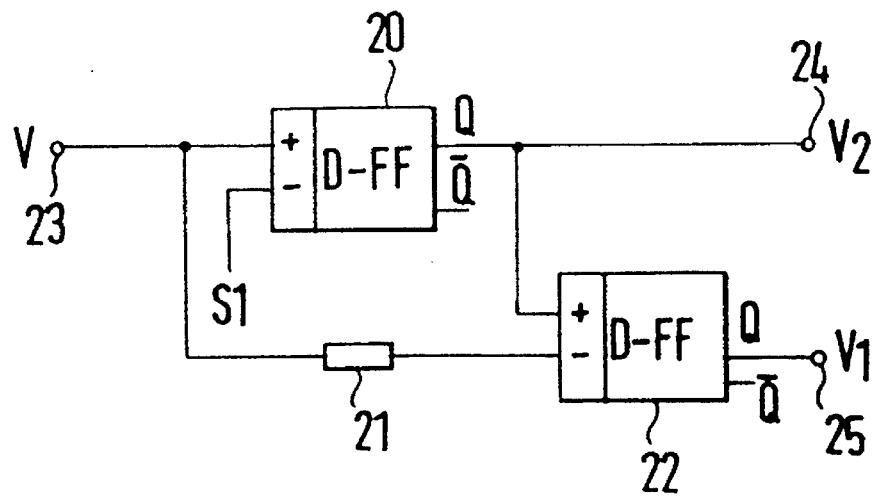
FIG. 3 shows a first embodiment of a decision circuit, according to the present invention.

FIG. 3 shows a first embodiment of the decision circuit 7. To enable the decision circuit 7 in the optical receiver 2 to recover the two digital signals $V_1$, $V_2$ from the four-level signal V, a threshold value S1 must be fixed. In FIG. 2 this threshold value S1 lies in the middle of the four-level signal V. The decision circuit recovers the digital signal $V_2$ from the four-level signal V by detecting that $V_2$ is in the 1 state when the threshold value S1 is exceeded. The digital signal $V_1$ is recovered according to the equation $V_1=V-V_2$.

The decision circuit of FIG. 3 has an input 23 for the four-level signal V, an output 25 for the digital signal $V_1$, an output 24 for the digital signal $V_2$, a first decision unit 20, a second decision unit 22, and a delay element 21.

Each decision unit 20, 22 has a first output Q and a second, inverting output $\overline{Q}$. The delay element 21 delays the four-level signal by the amount of time required to process the signal in the first decision unit 20. This is necessary since the digital signal $V_1$ is recovered by calculating the difference $V-V_2$; thus, $V_2$ must already have been recovered at the time the subtraction is performed. The first decision unit 20 compares the four-level signal V with the threshold value S1. When the latter is exceeded, the first output Q of the first decision unit 20 provides the digital signal $V_2$. This output corresponds to the output 24 of the decision circuit 7. The decision unit 22 is connected to the first output Q of the decision unit 20 and to the delay element 21, through which the four-level signal V is applied. The decision unit 22 performs the above-mentioned subtraction operation $V-V_2$, so that its first output Q, which corresponds to the output 25 of the decision circuit 7, provides the digital signal $V_1$.

Figure 4:
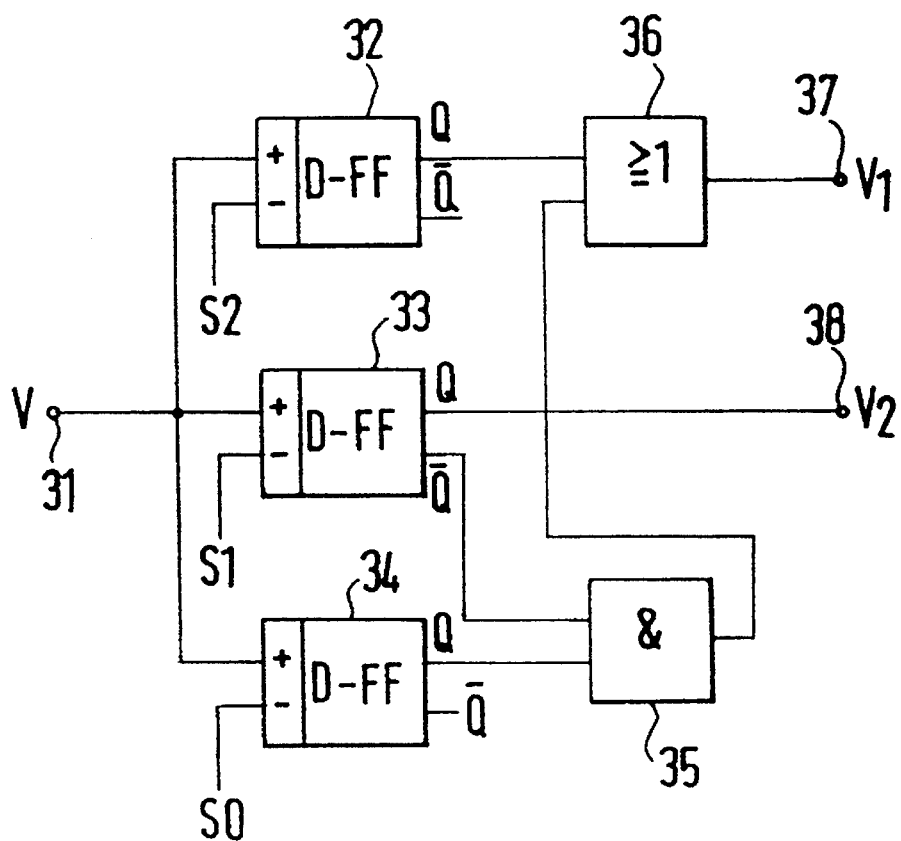
FIG. 4 shows a second embodiment of a decision circuit, according to the present invention.

A second embodiment of the decision circuit 7 of FIG. 2 is shown in FIG. 4. To enable the decision circuit 7 in the optical receiver 2 to recover the two digital signals $V_1$, $V_2$ from the four-level signal V, first, second, and third threshold values S0, S1, and S2 have to be fixed. In FIG. 2(c) the threshold values are located in the middle between the individual levels.

The decision circuit of FIG. 4, like that of FIG. 3, recovers the digital signal $V_2$ from the four-level signal V by detecting that $V_2$ is in the 1 state when the threshold value S1 is exceeded. It recovers the digital signal $V_1$ by detecting that $V_1$ is in the 1 state when the threshold value S2 is exceeded or when the threshold value S0 is exceeded and the threshold value S1 is not exceeded.

The decision circuit of FIG. 4 has an input 31 for the four-level signal V, an output 37 for the digital signal $V_1$, an output 38 for the digital signal $V_2$, first, second, and third decision units 32, 33, and 34, an AND gate 35, and an OR gate 36. The first decision unit 32 compares the four-level signal V with the upper threshold value S2. The second decision unit 33 compares the four-level signal V with the middle threshold value S1, and the third decision unit 35 compares the four-level signal V with the lower threshold value S0.

The first output Q of the second decision unit 33 provides the digital signal $V_2$. The second output $\overline{Q}$ of the second decision unit 33 and the first output Q of the third decision unit 34 are connected to the AND gate 35, whose output is coupled to the OR gate 36.

The OR gate 36 is also connected to the first output Q of the first decision unit 32, so that the output of the OR gate 36 provides the digital signal $V_1$. This output corresponds to the output 37 of the decision circuit, and the output which provides the digital signal $V_2$ corresponds to the output 38.

It will be evident to those of skill in the art from the foregoing teachings that it is also possible, according to the teachings hereof, to add more than two electric digital signals by means of the power combiner 3, so that the bit rate can be further increased.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. An optical transmission system with an optical transmitter (1), an optical waveguide (5), and an optical receiver (2), the optical transmitter (1) comprising an electrical-to-optical transducer (4), and the optical receiver (2) comprising an optical-to-electrical transducer (6) and a decision circuit (7), wherein the optical transmitter (1) includes an electrical power combiner (3) which adds a first applied electric digital signal ($V_1$) and a second applied electric digital signal ($V_2$) of equal bit period and different amplitudes bit by bit to form an electric multilevel signal (V) which is converted to an optical signal by the electrical-to-optical transducer (4) and then transmitted over the optical waveguide (5) to the optical receiver (2), in which the decision circuit (7) recovers the digital signals ($V_1$, $V_2$) from the electric multilevel signal (V) provided by the optical-to-electrical transducer (6).

2. An optical transmission system as claimed in claim 1, wherein the multilevel signal (V) is for modulating the frequency or amplitude of the light emitted by the electrical-to-optical transducer (4).

3. An optical transmission system as claimed in claim 1, wherein the multilevel signal (V) is a four-level signal composed of the two digital signals ($V_1$, $V_2$).

4. An optical transmission system as claimed in claim 3, wherein in the decision circuit (7), a lower threshold value (S0), a middle threshold value (S1), and an upper threshold value (S2) are fixed, wherein the decision circuit (7) detects a 1 state of the second digital signal ($V_2$) when the middle threshold value (S1) is exceeded, and wherein it detects a 1 state of the first digital signal ($V_1$) when the upper threshold value (S2) is exceeded or when the lower threshold value (S0) is exceeded and the first threshold value (S1) is not exceeded.

5. An optical transmission system or decision circuit as claimed in claim 4, wherein the decision circuit (7) comprises first, second, and third decision units (32, 33, 34) each having first and second outputs (Q, $\overline{Q}$), an AND gate (35), and an OR gate (36), with the first decision unit (32) for comparing the four-level signal (V) with the upper threshold value (S2), the second decision unit (33) for comparing the four-level signal (V) with the middle threshold value (S1), and the third decision unit (34) for comparing the four-level signal (V) with the lower threshold value (S0), so that the second digital signal ($V_2$) appears at the first output (Q) of the second decision unit (33), and wherein the second output ($\overline{Q}$) of the second decision unit (33) and the first output (Q) of the third decision unit (34) are connected to the AND gate (35), whose output is coupled to the OR gate (36), which is also connected to the first output (Q) of the first decision circuit (32), so that the first digital signal ($V_1$) appears at the output of the OR gate (36).

6. An optical transmission system as claimed in claim 3, wherein the decision circuit (7) comprises first and second decision units (20, 22), which each have an output (Q), and a delay element (21), the first decision unit (20) for comparing the four-level signal (V) with a threshold value (S1), so that when said threshold value (S1) is exceeded, the output (Q) of the first decision unit (20) provides the second digital signal ($V_2$), and the second decision unit (22) for comparing the second digital signal ($V_2$) appearing at the output (Q) of the first decision unit (20) with the four-level signal (V) delayed by the delay element (21), so that the output (Q) of the second decision unit (22) provides the first digital signal ($V_1$).

7. An optical transmission system as claimed in claim 1, wherein the power combiner (3) is for adding at least two applied electric digital signals of equal bit period and differing amplitudes bit by bit.

8. An optical transmitter (1) with an electrical-to-optical transducer (4), wherein it includes a power combiner (3) which adds a first applied electric digital signal ($V_1$) and a second applied electric digital signal ($V_2$) of equal bit period and different amplitudes bit by bit to form an electric multilevel signal (V) which is converted to an optical signal by the electrical-to-optical transducer (4) and then transmitted.

9. An optical transmission system according to claim 1, wherein the electrical-to-optical transducer (4) provides the optical signal with a transmission rate of at least 40 gigabits per second to the optical waveguide (5).

10. A decision circuit for a receiver of an optical transmission system with an optical transmitter (1), an optical waveguide (5), and an optical receiver (2), the optical transmitter (1) comprising an electrical-to-optical transducer (4), and the optical receiver (2) comprising an optical-to-electrical transducer (6) and a decision circuit (7), wherein in the decision circuit, a lower threshold value (S0), a middle threshold value (S1), and an upper threshold value (S2) are fixed, wherein the decision circuit (7) detects a 1 state of the second digital signal ($V_2$) when the middle threshold value (S1) is exceeded, and wherein it detects a 1 state of the first digital signal ($V_1$) when the upper threshold value (S2) is exceeded or when the lower threshold value (S0) is exceeded and the first threshold value (S1) is not exceeded.

11. An optical transmitter as claimed in claim 8, wherein the power combiner (3) is for adding at least two applied electric digital signals of equal bit period and differing amplitudes bit by bit.

12. An optical transmitter as claimed in claim 8, wherein the multilevel signal (V) is for modulating the frequency or amplitude of the light emitted by the electrical-to-optical transducer (4).

13. An optical transmission system or decision circuit as claimed in claim 10, wherein the decision circuit (7) comprises first, second, and third decision units (32, 33, 34) each having first and second outputs (Q, $\overline{Q}$), an AND gate (35), and an OR gate (36), with the first decision unit (32) for comparing the four-level signal (V) with the upper threshold value (S2), the second decision unit (33) for comparing the four-level signal (V) with the middle threshold value (S1), and the third decision unit (34) for comparing the four-level signal (V) with the lower threshold value (S0), so that the second digital signal ($V_2$) appears at the first output (Q) of the second decision unit (33), and wherein the second output ($\overline{Q}$) of the second decision unit (33) and the first output (Q) of the third decision unit (34) are connected to the AND gate (35), whose output is coupled to the OR gate (36), which is also connected to the first output (Q) of the first decision circuit (32), so that the first digital signal ($V_1$) appears at the output of the OR gate (36).

14. A decision circuit for an optical transmission system with an optical transmitter, an optical waveguide, and an optical receiver, the optical transmitter comprising an electrical-to-optical transducer, and the optical receiver comprising an optical-to-electrical transducer and a decision circuit, wherein the optical transmitter includes an electrical power combiner which adds a first applied electric digital signal and a second applied electric digital signal of equal bit period and different amplitudes bit by bit to form an electric multilevel signal which is converted to an optical signal by the electrical-to-optical transducer and then transmitted over the optical waveguide to the optical receiver, in which the decision circuit recovers the digital signals from the electric multilevel signal provided by the optical-to-electrical transducer, wherein the multilevel signal is a four-level signal composed of the two digital signals, and wherein the decision circuit comprises first and second decision units, which each have an output, and a delay element, the first decision unit for comparing the four-level signal with a threshold value, so that when said threshold value is exceeded, the output of the first decision unit provides the second digital signal, and the second decision unit for comparing the second digital signal appearing at the output of the first decision unit with the four-level signal delayed by the delay element, so that the output of the second decision unit provides the first digital signal.

* * * * *